US 8,473,517 B2

(12) United States Patent
Sly et al.

(10) Patent No.: US 8,473,517 B2
(45) Date of Patent: Jun. 25, 2013

(54) PRIVACY-SENSITIVE COOPERATIVE LOCATION NAMING

(75) Inventors: Matthew F. Sly, Jamaica Plain, MA (US); Reed P. Sturtevant, Lexington, MA (US); Shannon W. Bator, Needham, MA (US); Alexander James Jenkins, Boston, MA (US); Aryeh Goldberg, Newton, MA (US); Ravi S. Patel, Randolph, MA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 12/562,954

(22) Filed: Sep. 18, 2009

(65) Prior Publication Data
US 2011/0072034 A1  Mar. 24, 2011

(51) Int. Cl.
*G06F 17/30* (2006.01)
(52) U.S. Cl.
USPC ........................................ 707/784
(58) Field of Classification Search
USPC ........................................ 707/784
See application file for complete search history.

(56) References Cited

U.S. PATENT DOCUMENTS

| | | | | |
|---|---|---|---|---|
| 7,477,626 | B2* | 1/2009 | Chen et al. | 370/331 |
| 7,486,951 | B2* | 2/2009 | Chen et al. | 455/432.1 |
| 7,542,572 | B2* | 6/2009 | Meier et al. | 380/277 |
| 2001/0011954 | A1* | 8/2001 | Shelton et al. | 340/825.49 |
| 2006/0114839 | A1* | 6/2006 | Meier et al. | 370/254 |
| 2007/0130101 | A1* | 6/2007 | Anderson et al. | 707/1 |
| 2007/0281690 | A1 | 12/2007 | Altman et al. | |
| 2008/0104227 | A1 | 5/2008 | Birnie et al. | |
| 2008/0235242 | A1* | 9/2008 | Swanburg et al. | 707/10 |
| 2008/0242317 | A1 | 10/2008 | Abhyanker | |
| 2009/0005981 | A1 | 1/2009 | Forstall et al. | |

OTHER PUBLICATIONS

Forrest, Brady "Google's Latitude Adds Location-Sharing to Mobile Phones", pp. 1-8, http://radar.oreilly.com/2009/02/google-latitude-adds-location.html.
"BuddyCloud", 2009. Design by yellow-too, http://www.buddycloud.com/cms/node/92.
"Bluemapia Mobile Help", 2007, pp. 1-4, http://www.bluemapia.com/blog/?page_id=156.
"Location-Based Social Networks for iPhone", pp. 1-5, http://www.socialmediaplex.com/social-networking/locationbased-social-networks-iphone.
Haque, Nurul, "Vodafone Offers Location-Based Social Networking with Pocket Life", Dec. 29, 2008, pp. 1-8, http://mobile2mobility.com/vodafone-offers-location-based-social-networking-with-pocket-life/.
Annavaram et al., "Hangout: A Privacy Preserving Location Based Social Networking Service", http://www.motorola.com/innovators/ModusWorkshop/hangout_modus.pdf.
"Friends on Fire", 2009 Yahoo! Inc., http://apps.facebook.com/onfire/.

* cited by examiner

*Primary Examiner* — Baoquoc N To
(74) *Attorney, Agent, or Firm* — Microsoft Corporation (57) ABSTRACT

A location database may be configured to store a set of subjective, arbitrary, and/or ephemeral names assigned to a location by various users. When a user of a device arrives at a particular location, the device may retrieve and present to the user the set of names assigned to the location. Moreover, the names may be associated with a privacy designation, which may permit an author of a location name to indicate whether the name of a location should be shared with the public or restricted to access by the user (or to a specified group of users, etc.) Other access criteria may also be specified, e.g., read-only access to a name for the public and read/write access to a particular group of users. Within the set of names of a location, particular names may be designated as authoritative, and may be presented to users with emphasis.

20 Claims, 6 Drawing Sheets

PRIVACY-SENSITIVE COOPERATIVE LOCATION NAMING

BACKGROUND

In several computing scenarios, users may wish to assign names to various locations, where the selection of such names may be subjective, arbitrary, and/or ephemeral. For example, a user of a geolocation device, such as a global positioning system (GPS) receiver or a triangulation device based on cellular network towers or WiFi routers, may wish to identify locations of interest to the user, such as the home and workplace of the user and the residence of an associate, and to have such identifiers displayed on maps presented to the user. The user may also wish to share these names with other users, e.g., by transmitting a set of named locations to another device operated by a second user. The name assigned to the location by the first user may therefore be displayed for the second user, e.g., by a position-aware device that senses that the second user is in the proximity of the named location.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Where users wish to share the names assigned to various locations, a centralized location database may therefore be configured to store the names of locations assigned by various users, and may be accessed by the devices of various users to retrieve the names of various users attributed to a particular location. However, a particular user may not wish to share all names assigned to various locations with all users of the location database, particularly if the location database is publicly accessible. For example, a user may name a first location as "my favorite restaurant," a second location as "my house," and a third location as "my physician's office." If the user transmits these names to a location database, the user may be amenable to sharing the name of the first location with the entire public, but may wish to share the name of the second location only with a small group of users (e.g., friends of the user), and may wish to restrict the name of the third location to access by himself or herself.

In order to accommodate the privacy interests of the user in sharing location names, a location database may be configured to store with each name of a location a privacy designation, such as a public designation indicating permission by the user to transmit the location to any other users or a private designation indicating a preference to restrict access to the name of the location to the user. Other privacy designations may also be available, e.g., a group designation indicating that the user wishes to grant permission to access the name of the location only to a particular set of users. When the user is subsequently near a particular location, the location database may then be queried for all names of the location having either a public designation, and for all names having a private designation and that were created by the user; all such names may then be presented to describe the current location of the user. In this manner, a shared location database may be generated that is configured to recognize and support the privacy interests of the users in assigning names to various locations.

Additional variations may also be devised that may present additional advantages. Additional access designations may be supported; e.g., the names of a particular area (such as a building) may be designated or edited only by a particular user having permission to name the location represented by the area, but the public may be able to access the names of the location on a read-only basis. Additionally, among the set of names assigned to a location by various users, a particular subset of names may be designated as authoritative; e.g., members of the public may be permitted to assign names to a location, but a set of authoritative names may also be retrieved from an authoritative location name source, such as a trusted location name directory, and may be presented with emphasis among all of the names of the location.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios may involve a naming of locations by one or more users. As a first example, a mapping application may present a visual depiction of an area, and users may choose locations of interest and may assign names to the various locations. As a second example, a global positioning system (GPS) receiver may detect the location of a user, may permit the user to assign a name to the current location; when the user subsequently approaches the location, the device may identify the previously specified names of the location, and may present the names to the user. The capability of naming locations may permit various advantages, e.g., by permitting a user to request routing to a destination according to a name familiar to or preferred by the user. Such names may also be assigned subjectively (e.g., a designation only relevant to a particular user or set of users, such as "home"), arbitrarily (e.g., according to a semantic that is difficult to determine from the location, such as the starting point of a foot race), and/or ephemerally (e.g., a streetside location where a user may have temporarily parked a vehicle, or names associated with a particular event, such as mile markers along a race course.)

Moreover, a user may wish to share the designated names of one or more locations with other users. For example, a user may assign a set of names to various locations (e.g., "best Italian restaurant in town" and "scenic view in the park"), and may wish to share such names of the locations with the public. A location database may therefore be devised and configured to store the names attributed to various locations by various users. When a user is near a location, the location database may be queried for the names of the location specified by the user and other users, and may present all such names to the user in order to describe the location. In this manner, a set of users, perhaps as broad as the general public, may cooperatively describe the locations of an area in a "crowdsourced" manner.

Figure 1:
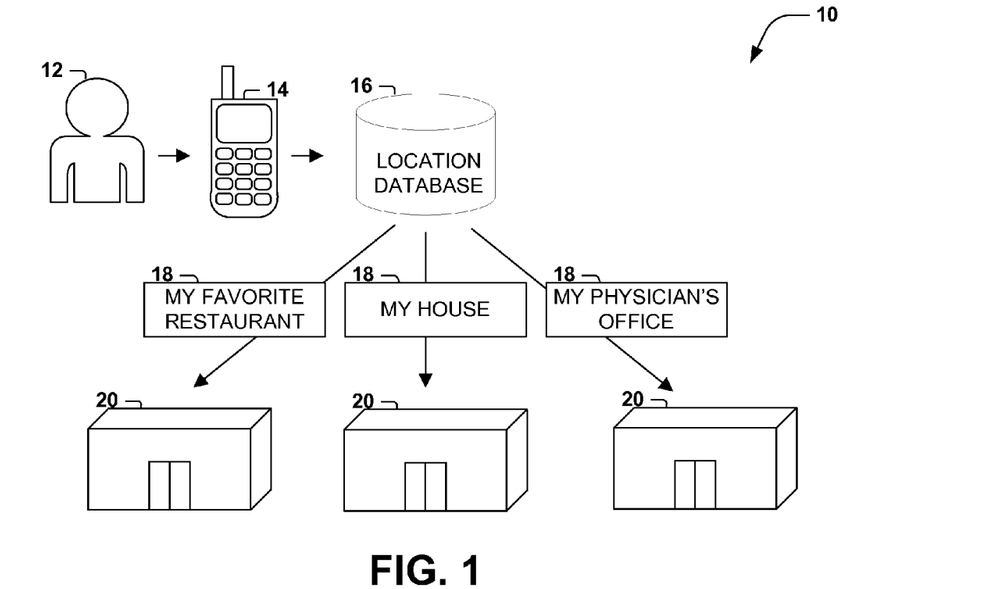
FIG. 1 is an illustration of an exemplary scenario featuring an assignment by a user of names to various locations.

FIG. 1 presents an exemplary scenario 10 depicting a user 12 of a device 14 who wishes to assign various names 18 to a set of locations 20. A first location 20 may be assigned a name 18 of "my favorite restaurant"; a second location 20 may be assigned a name 18 of "my house"; and a third location 20 may be assigned a name 18 of "my physician's office." These names 18 and associated locations 20 may be loaded into various types of devices 14, e.g., into a global positioning system (GPS) receiver, which may then present the names 18 to the user 12 in relevant contexts, such as a map of the current location of the user 12 including the names 18 assigned to locations 20 in the vicinity, or a set of known destinations to which the user 12 may wish to travel. Moreover, these names 18 may be shared with other users 12, e.g., a shared address book comprising a set of locations of the homes of various individuals, with the locations (such as latitude, longitude, and altitude coordinates) associated with names 18 identifying such locations as the homes of the users 12. One technique for sharing the names 18 among users 12 involves storing the names 18 in a location database 16, which may be accessed by various users 12 to identify the names 18 of various locations 20.

Figure 2:
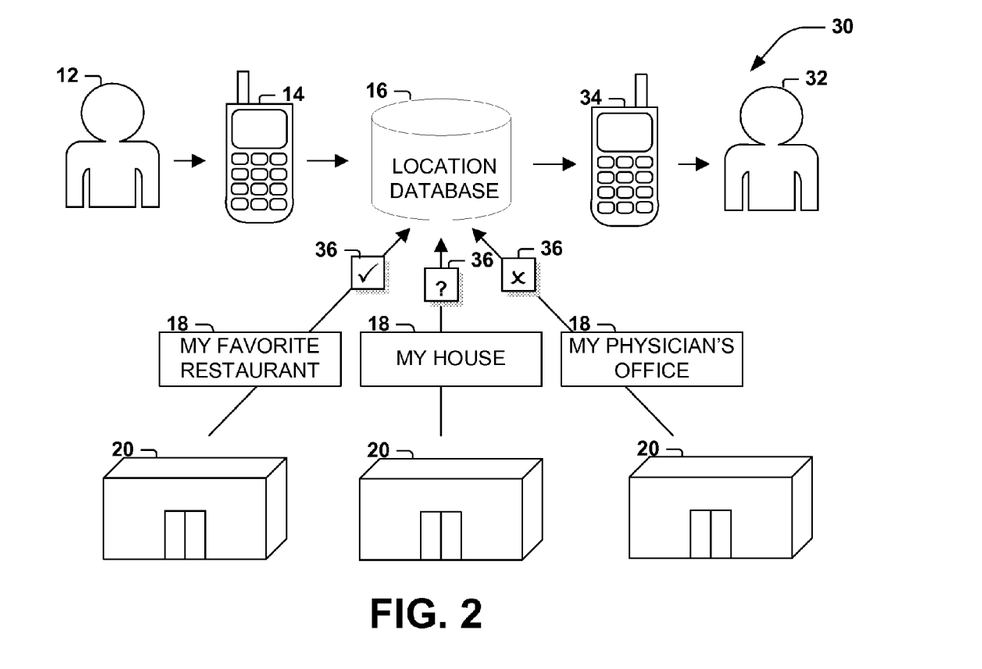
FIG. 2 is an illustration of an exemplary scenario featuring a presentation to a second user of names assigned to various locations by a first user.

However, in some scenarios, a user 12 may not wish to share all names 18 assigned to all locations 20 with the general public. FIG. 2 presents another exemplary scenario 30, wherein a first user 12 of a device 14 has assigned the names 18 to various locations 20 in a similar manner as the exemplary scenario 10 of FIG. 1, such as a first location 20 having a name 18 "my favorite restaurant," a second location 20 having a name 18 "my house," and a third location 20 having a name 18 "my physician's office." The names 18 of various locations 20 are again stored in a location database 16, which may provide the names 18 to other users 12, such as by sharing the names 18 assigned by the first user 12 with a second user 32 of a second device 34. However, the first user 12 may wish to control which names 18 are shared in this manner. For example, the first user 12 may be willing to share the name 18 of the first location 20 with any other user, including the second user 32. However, the first user 12 may wish to share the name 18 of the second location 20 ("my house") only with a select set of users, such as the user's friends and family members, in order to preserve the privacy of the residence of the user 12 from unknown individuals. Regarding the third location 20 to which the first user 12 has assigned the name 18 "my physician's office," the first user 12 may be uncomfortable sharing this name 18 even with friends and family, and may wish to restrict the location database 16 to present the name 18 of this location 20 only with the first user 12.

If the location database 16 is configured simply to share names 18 of locations 20 with the public, the privacy preferences of various users 12 may be disregarded. As another technique, the user 12 may choose to deliver to the location database 16 only the names 18 that may be publicly accessible, and may choose to restrict to the device 14 the names 18 that are not to be shared with the public, thereby applying the privacy preferences of the user 12 on the device level. However, this scenario may introduce undesirable complexities, such as multiple sources of names 18 of locations 20 and a potential inability to present a private name 18 to the user 12 on a first device 14 that is restricted to a second device 14 owned by the same user 12.

An alternative technique may be devised to facilitate the association of names with locations while respecting the privacy preferences of the users of such locations names, while also avoiding the complexities of handling privacy preferences at the device level. A location database 16 may be configured to store, for a particular location 20, one or more names 18 with a privacy designation, which may indicate a privacy preference of the author regarding the sharing of the name with other users. For example, the privacy preference may be selected from a set of privacy designations including a public designation that permits public access to the name and a private designation that indicates restricted access based on various criteria (e.g., access only by the user, or only by a group of users specified by the user.) Accordingly, the device 14 operated by the user 12 may be configured to store and access names 18 of locations 20 in view of the privacy designations specified by the user 12 and stored in the location database 16. For example, when the user 12 specifies a name 18 of a location 20, the device 14 may also receive from the user 12 a privacy designation indicating the privacy preferences of the user 12 with regard to the name 18, and may accordingly store the name 18 in the location database 16 with this privacy designation. When the user 12 later approaches a location 20, the device 14 may access the location database 16 to select any names 18 of the location 20 that the user 12 is permitted to access, including names 18 of the location 20 having a public designation and names 18 having a private designation that permits access by the user 12 (i.e., a private designation that specifies criteria for access, such as a particular username or user ID, where such criteria are satisfied by the user 12.) The device 14 may then present to the user 12 the names 18 selected from the location database 16 as a description of the location 20. In this manner, the location database 16 and the device 14 may together facilitate the naming of a set of locations 20 by a set of users 12, while also respecting the privacy preferences of the users 12 as to who may access a particular name 16 of a location 20.

Figure 3:
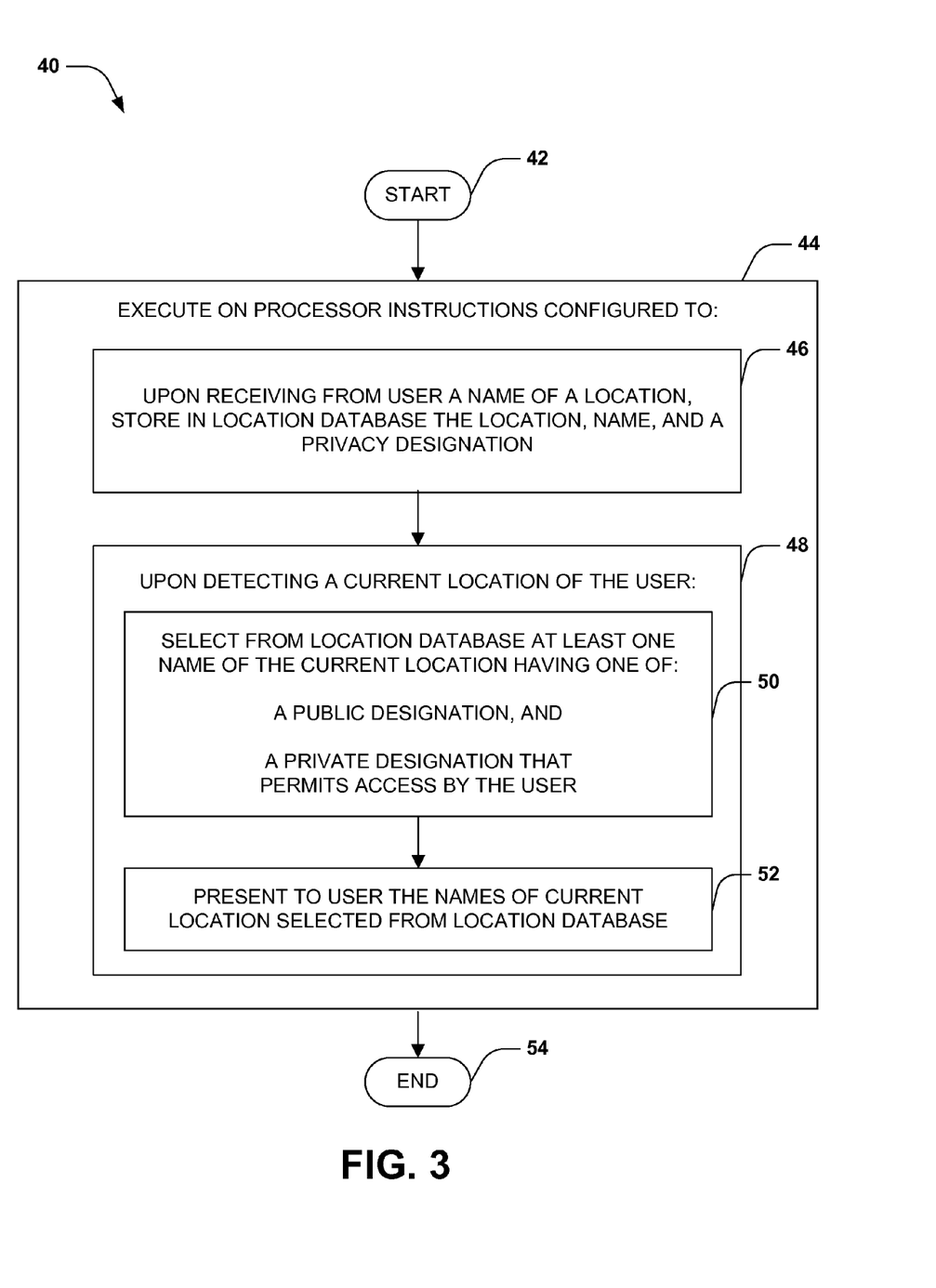
FIG. 3 is a flowchart illustrating an exemplary method of facilitating users in associating names with locations.

FIG. 3 presents an exemplary first embodiment of these techniques, illustrated as an exemplary method 50 of facilitating a user in associating names with locations. The exemplary method 50 may be performed, e.g., on a device comprising a processor and having access to a location database that is configured to store and provide access to the names of various locations. The exemplary method 50 begins at 52 and involves executing 54 on the processor instructions configured to implement the techniques discussed herein. More specifically, the instructions may be configured to, upon receiving from the user 12 a name 18 of a location 20, store 46 in the location database 16 the location 20, the name 18, and a privacy designation 36 selected from a set of privacy designations comprising a public designation and a private designation. The instructions may also be configured to, upon detecting 48 a current location 20 of the user 12, select 50 from the location database 16 at least one name 18 of the current location 20 having either a public designation (i.e., which may be accessed by anyone), or a private designation that permits access by the user 12 (i.e., a set of criteria that are to be satisfied before granting access to the name 18, which criteria the user 12 happens to satisfy), and present 52 to the user 12 at least one name 18 of the current location 20 selected from the location database 16. Having facilitated the storing of names 18 of locations 20 and the presenting of the names 18 if the user 12 later encounters the location 20 in view of the privacy preferences of an author of the name 18, the exemplary method 40 thereby facilitates the association of names with locations in the location database 16, and so ends at 54.

Figure 4:
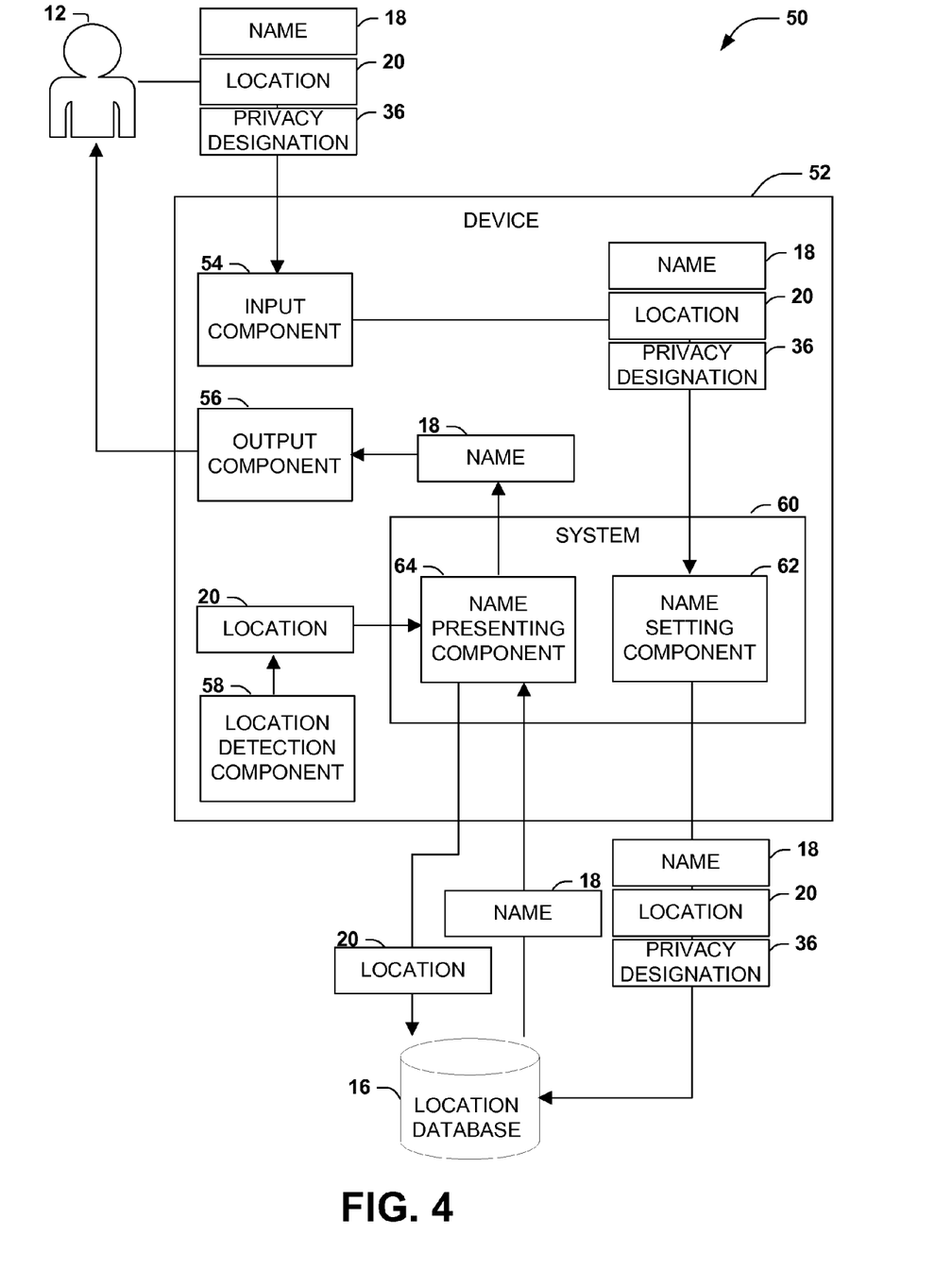
FIG. 4 is a component block diagram illustrating an exemplary system for facilitating users in associating names with locations.

FIG. 4 presents a second embodiment of these techniques, illustrates as an exemplary scenario 50 featuring an exemplary system 60 that may be incorporated in an exemplary device 52 in order to implement on behalf of a user 12 the techniques presented herein. The exemplary device 52 comprises an input component 54, such as a hardware keyboard, a touchscreen coupled with a software keyboard or a handwriting recognition component, and/or a microphone associated with a speech recognition component. The exemplary system 52 also comprises an output component 56, such as a display configured to render text or images or a speaker configured to present audio information, such as speech, to the user 12. The exemplary device 52 also includes a location detection component 58, such as a geolocation component (e.g., a global positioning system (GPS) receiver) or a triangulation device based on cellular network towers or WiFi routers, which may identify a current location of the user 12. The exemplary device 52 also has access to a location database 16 configured to store the names 18 of various locations 20 specified by various users 12, and to present the names 18 to users 12 upon request and according to the privacy preferences of the authors of such names 18.

Within such a device 52 as presented in the exemplary scenario 50 FIG. 4, an exemplary system 60 may be implemented that facilitates the interfacing of the user 12 with the location database 16 while attempting to assign and access the names 18 of various locations 20. The exemplary system 60 comprises a name setting component 62, which may be configured to, upon receiving from the user 12 a name 18 of a location 20, store in the location database 16 the location 20, the name 18, and a privacy designation 36. The privacy designation 36 may, e.g., be selected from a set of privacy designations comprising a public designation and a private designation (possibly among other designations, such as a group designation.) The name setting component 62 thereby facilitates the setting of names 18 of locations 20 and the assignment of privacy restrictions thereto. The name 18 may be received from the input component 54 in many ways, such as text input from a hardware or software keyboard, handwriting interpreted by a handwriting recognition component, or spoken input interpreted by a speech recognition component. The exemplary system 60 also features a name presenting component 64, which may be configured to present to the user 12 the names 18 of a current location 20 of the user 12. More specifically, the name presenting component 64 may be configured to, receiving from the location detection component 58 a current location 20 of the user 12, select from the location database 16 at least one name 18 of the current location 20, where the name 18 is associated either with a public designation, or with a private designation that permits access by the user 12 (i.e., a set of access criteria that the user 12 happens to satisfy.) The name presenting component 64 is also configured to present to the user 12 at least one name 18 of the current location 20 selected from the location database 16. For example, the name presenting component 64 may deliver the names 18 selected from the location database 16 to the output component 56, which may present the names 18 to the user 12 in various ways (e.g., as labels of locations 20 on a map, as a text list of names 18 of the current location 20 and/or nearby locations, or as one or more spoken names.) The exemplary system 60 thereby facilitates the user 12 in assigning and accessing the names 18 of various places 20 in view of the privacy preferences of the authors of such names 18.

Figure 5:
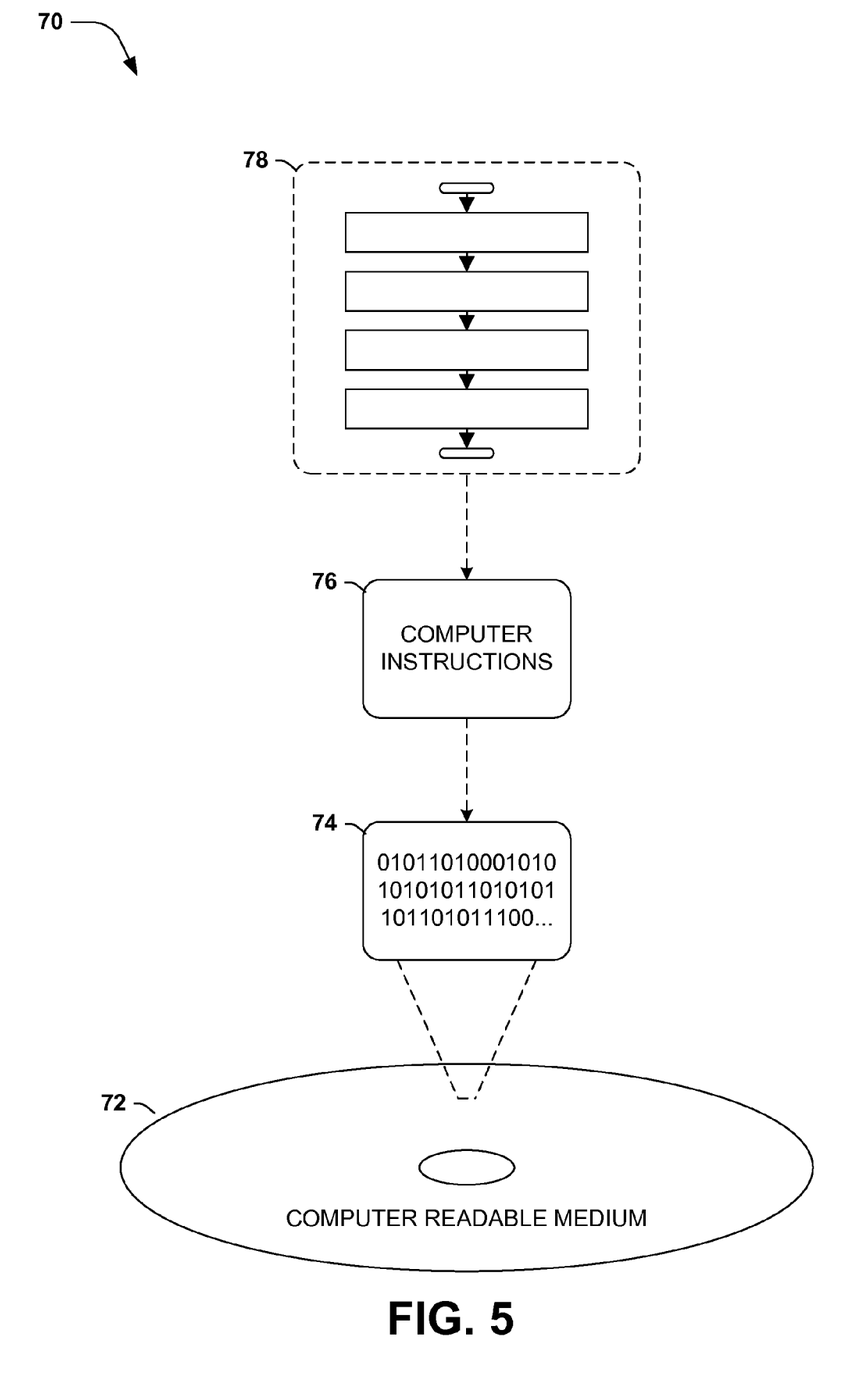
FIG. 5 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 5, wherein the implementation 70 comprises a computer-readable medium 72 (e.g., a CD-R, DVD-R, or a platter of a hard disk drive), on which is encoded computer-readable data 74. This computer-readable data 74 in turn comprises a set of computer instructions 76 configured to operate according to the principles set forth herein. In one such embodiment, the processor-executable instructions 76 may be configured to perform a method of facilitating users in associating names with locations, such as the exemplary method 40 of FIG. 3. In another such embodiment, the processor-executable instructions 76 may be configured to implement a system for facilitating users in associating names with locations, such as the exemplary system 60 of FIG. 4. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 3 and the exemplary system 60 of FIG. 4) to confer individual and/or synergistic advantages upon such embodiments.

A first aspect that may vary among embodiments of these techniques relates to the scenarios in which such techniques may be utilized. As a first example, many computing scenarios may advantageously incorporate the techniques discussed herein, such as a mapping application configured to identify locations 20 of interest to various users 12 according to the names 18 assigned thereto, or a global positioning system (GPS) receiver configured to display maps of the current location of a user 12, which may be capable of directing the user 12 to various locations 20 according to the names specified by the user 12 and other users 12. As a second example, the techniques may be utilized in conjunction with other system and services; e.g., a representation of a set of users 12 and the relationships may be stored by a social networking service, and the association of names 18 with locations 20 may be layered on top of the social networking service. As one such example, a social networking service may allow each user 12 to designate names 18 of locations 20.

The privacy policies of the social networking service may extend to the storing and retrieving of names 18 of locations 20; e.g., a user 12 who defines a location 20 the name 18 "Joe's Office" may indicate that only friends of the user 12 (as represented by the social networking service) may access this name 18.

As a third example of this first aspect, these applications may be accessible to various sets of users 12, devices 14, and/or locations 20. In a first set of embodiments, the users 12 may comprise a closed user set defined in a directory, or an open user set open to the general public that promotes the description of locations in an area through a "crowdsourcing" mechanism implemented according to the techniques discussed herein. For example, the names 18 of the locations 20 may be related to a particular event, such as markers along a race course, and the users may comprise attendees of the event. In a second set of embodiments, the devices 14 may comprise, e.g., cellular phones, global positioning system (GPS) receivers, small-form-factor computers, tablets, and/or subnotebooks. In a third set of embodiments, the locations 20 to which these techniques are applied may comprise actual geographic locations, virtual locations in a simulated environment, locations in space, or locations in a closed system, such as a machine or an organism. Those of ordinary skill in the art may devise many scenarios within which the techniques discussed herein may be utilized.

A second aspect that may vary among embodiments of these techniques relates to the manner of storing in the location database 16 an association of a name 18 with a location 20, as may be specified by a user 12. As a first example, the name 18 may be specified by the user 12, such as through input received via an input component 54 such as a hardware keyboard, touchscreen coupled with a software keyboard or handwriting recognition component, or microphone coupled with a voice recognition component. Alternatively or additionally, the device 14 may generate one or more names 18 of a location 20 and may suggest such names 18 to the user 12, who may accept one or more as the designated names of the location 20. For example, the device 14 may present a list of common names 18, such as "home," "office," "school," and "grocery store," and a user 12 may select a particular name 18 as the designated name of a location 20 according to the subjective judgment of the user 12. The device 14 might also suggest an appending of the name of the user 12 to the name 18 of a location 20, e.g., "Joe's Home" for a location 20 designated as home by a user 12 named Joe.

As a second example, the names 18 specified for a location 20 by various users 12 may be sorted, grouped, or ranked in various ways. This may be helpful, e.g., for presenting several names 18 of a location 20 to a user 12 in a manner with a more highly suggested name 18 promoted over a less suggested name 18, which may help to identify for the user 12 more significant information about the location 20. In one such set of embodiments, among the names 18 of a location 20, zero or more names 18 may be selected as an authoritative name, such as a name 18 that is trusted to be reliable, descriptive, accurate, or otherwise preferred with respect to the location 20. In one such embodiment, the device 14 and/or the location database 16 may have access to an authoritative location name source, which may identify, among the names 18 of a location 20, one or more names derived from or matching the corresponding entries in the authoritative location name source. The users 12 may then be permitted to access such authoritative names, e.g., on a read-only basis. In another such embodiment, users 12 may vote on various names 18, or user selection of various names 18 may be tracked, in order to identify one or more often preferred names 18 as compared to other names 18 of a location 20. These names 18 may then be identified as the authoritative names of the location 20, which may facilitate the presentation of names to the user 12 in a more meaningful manner. For example, while presenting the names 18 of the locations 20 to the user 12, the device 12 may present with emphasis the names 18 designated as authoritative names of the location 20.

Figure 6:
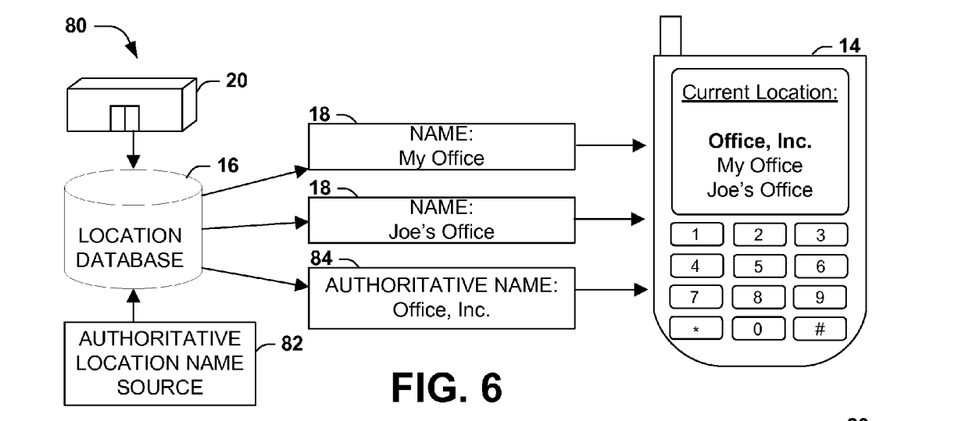
FIG. 6 is an illustration of an exemplary scenario featuring a set of names of a location including an authoritative name.

FIG. 6 presents an exemplary scenario 80 featuring a presentation of authoritative names among a set of names 18 of a location 20. A location database 16 may store a set of names 18 of the location 20, which may be accessed by a device 14 for presentation to a user 12. However, the location database 16 may also have access to an authoritative location name source 82, e.g., a database of authoritative names of various locations, which may be maintained by a trusted authority. The location database 16 may compare the names 18 stored for the location 20 with any names 18 for the location 20 that may be provided by the authoritative location name source 82, and any matching names may be regarded as authoritative names 84 of the location 20. For example, among the names "My Office," "Joe's Office" and "Office, Inc." that may be specified by various users for the location 20, the name "Office, Inc." may match an entry for the location 20 provided by the authoritative location name source 82. Therefore, when presenting the names 18 to the user 12, the device 14 may present the authoritative name 84 with emphasis, e.g., in a different font or style, or by presenting the authoritative name 84 before the other names 18 of the location 20.

As a third example, the privacy designation 36 specified for the name 18 of a location 20 may be provided and stored in many ways. As a first example, the user 12 may specify a privacy designation 36 along with each specified name 18 of a location 20 submitted for storage in the location database 16. Alternatively or additionally, the device 14 may suggest a privacy designation 36 according to the name 18 (e.g., names involving the term "home" may be suggested or automatically designated as private; names involving the term "office" or "work" may be suggested or automatically designated as accessible only to a group, such as friends of the user 12; and names involving the term "restaurant" may be suggested or automatically designated as public.)

As a fourth example, the location database 16 may be configured to represent locations 20 in many ways. In one such embodiment, the location database 16 may represent respective geographic locations by a single latitude, longitude, altitude coordinate. In another such embodiment, locations 20 may also be represented of various sizes, such as a radius surrounding a coordinate. In another such embodiment, the location 20 may be more precisely defined by a set of coordinates that comprise an area (including a three-dimensional volume.) Alternatively or additionally, the location 20 may be represented as changing over time, or may only be applicable for a particular period of time. The user 12 may therefore associate a name 18 with an area associated with a location 20. As a first such example, the location database 16 may be configured to associate with respective locations 20 an area designation, such as a set of coordinates, that may represent an area associated with location 20 and/or with a particular name 16. As a second such example, the user 12 may define an area designation (e.g., a set of coordinates) of a location 20, which may be stored by the location database 20. Moreover, in a further such embodiment, various locations 20 may be represented as restricted to particular users 12; e.g., an area representing property owned by a particular user 12 may be restricted to naming only by that user 12. In one such embodiment, storing a name 18 of a location 20 in the location database 16 may involve identifying the user 12 and querying whether the user 12 is permitted to name the area, and therefore storing the name 18 of the location 20 only after verifying such permission.

Figure 7:
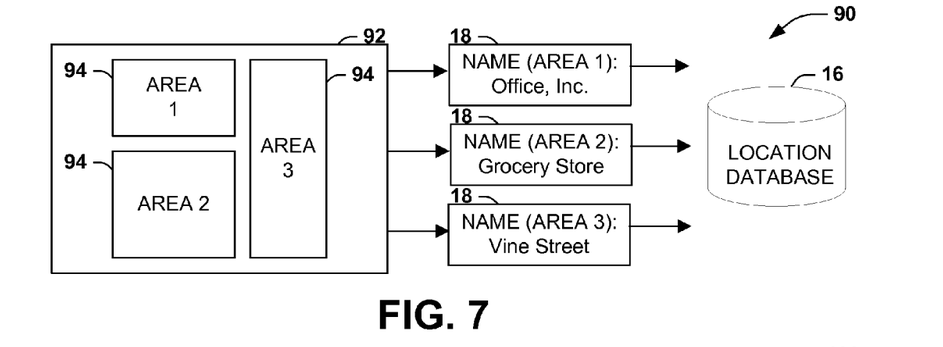
FIG. 7 is an illustration of an exemplary scenario featuring an association of names with locations respectively having an area designation.

FIG. 7 presents an exemplary scenario 90 featuring an association of names 18 with locations 20 represented as areas 94 within a particular region 92, such as two buildings (Area 1 and Area 2) of different sizes that are adjacent to a street (Area 3.) Such areas may be defined in many ways; e.g., image analysis techniques maybe applied to an aerial or satellite photograph to identify shapes corresponding to buildings or other units that may share a name, or a user may designate the sizes, shapes, and positions of various areas 94 according to many criteria. For each location 20 represented as an area 94, one or more names 18 may be associated (e.g., Area 1 may be associated with the name 18 "Office, Inc."; Area 2 may be associated with the name 18 "Grocery Store"; and Area 3 may be associated with the name 18 "Vine Street.") The areas 94 of various locations 20 may also be stored in the location database 16, which may promote the accuracy of associating names 18 with a particular location 20 (e.g., associating names 18 with a location comprising a large building may be more accurately represented as associated with an area 94 representing the location than as associated with a single latitude, longitude, and altitude coordinate.) Those of ordinary skill in the art may devise many techniques for storing the names 18 of various locations 20 specified by the users 12 according to the techniques discussed herein.

A third aspect that may vary among embodiments of these techniques relates to the manner of locating the user 12 at a current location 20, prior to selecting names 18 of the current location 20 and presenting the names 18 to the user 12. As a first example, many techniques may be utilized to identify the location of the user 12, such as various components that may suitably serve as the location identifying component 58 in the exemplary device 52 of FIG. 4. One such embodiment involves a geolocation component, such as a global positioning system (GPS) receiver that is configured to coordinate with satellites in order to triangulate the current location 20 of the user 12. Another such embodiment may involve a reference point identifying component, which may identify nearby reference points of known locations, such as cellular network towers or wireless network routers, and may triangulate or identify the current location 20 of the user 12 with respect to the identified reference points. Many other components may serve to identify the current location 20 of the user 12. Moreover, the accuracy of the location 20 of the user 12 may be improved in various ways. As one such example, it may be recognized that some techniques of locating the current location 20 of the user 12 may be inaccurate; e.g., a global positioning system (GPS) receiver may detect the current location 20 of the user 12 with a specified degree of accuracy, such as a radius of uncertainty. In order to improve the accuracy of the detected current location 20, the device 14 may detect an approximate current location 20 of the user 12, and may present the approximate current location 20 to the user 12. The user 12 may then be permitted to specify a more accurate current location 20, e.g., by presenting the user 12 with a map including the detected radius of uncertainty, and allowing the user 12 to pinpoint a more accurate current location 20 as his or her current location 20. The device 14 may therefore select the more accurate current location 20 as the current location 20. Those of ordinary skill in the art may devise many techniques for identifying the location 20 of the user 12 while implementing the techniques discussed herein.

A fourth aspect that may vary among embodiments of these techniques relates to the manner, after detecting the current location 20 of a user 12, of presenting names 18 of a location 20 to the user 12. As a first example, the names 18 selected from the location database 16 may be presented in any order, including as labels of locations 20 on a map, as a text list of names 18 of the current location 20 and/or nearby locations, or as one or more spoken names. As a second example, the names may be presented in any order or ranking, such as sorted alphabetically, by frequency of use by the user 12, or with emphasis on authoritative names 18 designated among the names 18 of the location 20. As a third example, the names 18 may be selected and presented that are within a particular proximity to the current location 20 of the user 12. In one such embodiment, for respective names 18 retrieved from the location database 16, the distance from the location 20 associated with the name 18 (e.g., from the latitude, longitude, and altitude coordinates of the location 20) to the current location 20 of the user 12 may be calculated, and the device 14 may present the names 18 to the user 12 sorted according to the calculated distances.

As a fourth example of this fourth aspect, the names 18 selected from the location database 16 may be filtered according to various criteria specified by the user 12. In one such set of embodiments, the user 12 may specify a name query, which may specify come conditions regarding the types of names 18 and/or locations 20 with which the user 12 wishes to be presented. The device 14 may therefore be configured to query the location database 16 for names 18 and/or locations 20 matching the name query, and to present to the user 12 the names 18 matching the name query. As a first example, the name query may specify a name type filter, such as an all names filter having no restrictions on the names 18 of the locations 20, and an author identifier filter that restricts the names 18 of the presented locations 20 to those authored by a particular user 12, e.g., those having an author identifier of at least one specified author. As a second example, the set of name type filters may include an authoritative name filter, which may selectively specify names 18 designated by the location database 16 as authoritative names 36 for the location 20. As a third example, the set of name type filters may include an author group filter, which may limit the selected names 18 to those created by users 12 within a specified author group (e.g., any author within a "friends" group designated by the user 12.) As a fourth example, various names 18 may be associated with a particular event, such as markers along a race course, and the set of name type filters may include an event filter that allows the user 12 to specify one or more events, and to limit the presented names 18 to those associated with a specified event. As a fifth example, various names 18 that are ephemeral may be associated with a valid duration, e.g., a set of dates between which the name 18 may be valid (such as markers of a location for a limited-time event), and the name type filters may include a time filter that limits the presented names 18 those having a valid duration that comprises a specified time, such as the current time. Additional name type filters may specify many such criteria, and may, e.g., apply Boolean logic or weighting among the criteria to produce more sophisticated queries.

Conversely, an author of a name 18 of a particular location 20 stored in the location database 16 may specify particular users 12 who are permitted to view the name 18. Accordingly, the location database 16 may be configured to associate with a name 18 of a location 20 at least one user 12 who is permitted to view the name 18. When a user 12 queries the location database 16 for a set of names 18, the location database 16 may apply the privacy preferences of the author on a per-name basis. For example, for respective names 18, the location database 16 may query whether the user 12 is permitted to view the name 18, and upon verifying that the user 12 is permitted to view the name 18, may select the name 18 of the location 20 to be presented to the user 12. Other types of restrictions may also be specified and applied during the selection and presentation of names 18; e.g., some users 12 may be permitted read/write access to a particular name 18, while other users 12 may be permitted only read access to the same name 18, and still other users 12 may be restricted from accessing the name 18.

Regardless of the criteria specified by the selected name type filter, the device 14 may then restrict the names selected from the location database 16 and presented to the user 12 according to the name type filter. This restriction may be performed, e.g., by the device 14 after receiving an unrestricted set of names 18 from the location database 16, and/or by the location database 16 as part of the name selection. Alternatively, the names 18 of the locations 20 may be scored with regard to the degree of matching the name query, and may be presented in an order sorted by the degree of matching. Moreover, if the name type filter fails to identify at least one location matching the name query, the device 14 may be configured to query the user 12 whether to create a name 18 of the current location 20 according to the name query (i.e., to create a name 18 for the location 20 that satisfies the filter), and upon receiving from the user 12 a confirmation, may store the name 18 and the current location 20 of the user 12 in the location database 16.

Figure 8:
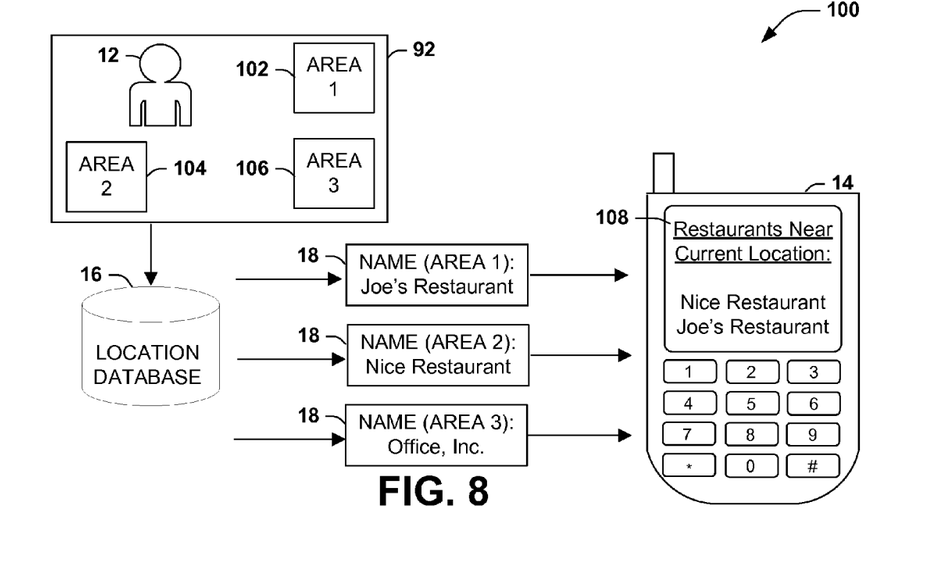
FIG. 8 is an illustration of an exemplary scenario featuring a query of names of locations and a presentation of such names with a name type filter.

FIG. 8 presents an exemplary scenario 100 featuring a sorting of names 18 according to the corresponding distances of the associated locations 20 to the current location 2 of the user 12 of a device 14, as well as a filtering of the names 18 according to a name type filter. In this exemplary scenario 100, a user 12 is present in a region 92, and the current location 20 of the user 12 may be detected (e.g., through a global positioning service (GPS) receiver component built into the device 14.) The location database 16 may then be queried for locations 20 to which the user 12 has access (e.g., those having a public designation, or those having a private designation that the credentials of the user 12 satisfy), and that are also near the current location 20 of the user 12, such as a first area 102 named "Joe's Restaurant," a second area 104 named "Nice Restaurant," and a third area 106 named "Office, Inc." The distances from the current location 20 to the respective locations 20 associated with these names 18 may be calculated, and the names 18 may be presented to the user 12 sorted according to the respective calculated distances. Moreover, the user 12 may specify a name query 108, such as names including the word "Restaurant." The names 18 presented by the device 14 may therefore be restricted to exclude the third area 106 ("Office, Inc.") As a result, the device 14 presents to the user 12 the names 18 of restaurants in the vicinity of the user 12, sorted according to the respective distances of the associated locations (e.g., the second area 104 is presented before the first area 102.) In this manner, the device 14 may facilitate the presentation to the user 12 of names 18 of nearby locations 20, even if such names 18 are created by other users 12 of the location database 16, while also respecting the privacy preferences of the authors of such names 18. Those of ordinary skill in the art may devise many ways of presenting the names 18 of various locations 20 while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
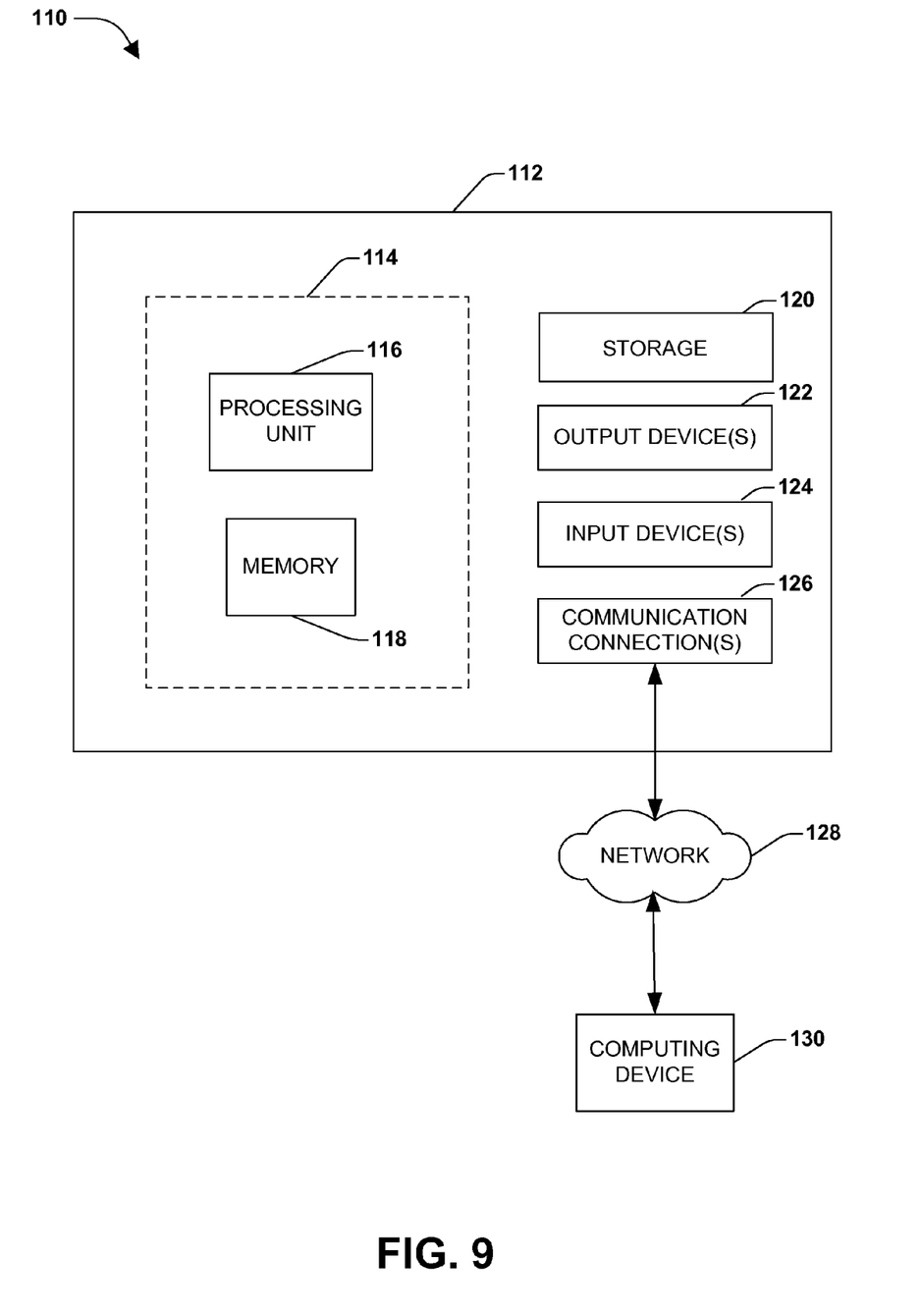
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 110 comprising a computing device 112 configured to implement one or more embodiments provided herein. In one configuration, computing device 112 includes at least one processing unit 116 and memory 118. Depending on the exact configuration and type of computing device, memory 118 may be volatile (such as RAM, for example), non-volatile (such as ROM, flash memory, etc., for example) or some combination of the two. This configuration is illustrated in FIG. 9 by dashed line 114.

In other embodiments, device 112 may include additional features and/or functionality. For example, device 112 may also include additional storage (e.g., removable and/or non-removable) including, but not limited to, magnetic storage, optical storage, and the like. Such additional storage is illustrated in FIG. 9 by storage 120. In one embodiment, computer readable instructions to implement one or more embodiments provided herein may be in storage 120. Storage 120 may also store other computer readable instructions to implement an operating system, an application program, and the like. Computer readable instructions may be loaded in memory 118 for execution by processing unit 116, for example.

The term "computer readable media" as used herein includes computer storage media. Computer storage media includes volatile and nonvolatile, removable and non-removable media implemented in any method or technology for storage of information such as computer readable instructions or other data. Memory 118 and storage 120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 112. Any such computer storage media may be part of device 112.

Device 112 may also include communication connection(s) 126 that allows device 112 to communicate with other devices. Communication connection(s) 126 may include, but is not limited to, a modem, a Network Interface Card (NIC), an integrated network interface, a radio frequency transmitter/receiver, an infrared port, a USB connection, or other interfaces for connecting computing device 112 to other computing devices. Communication connection(s) 126 may include a wired connection or a wireless connection. Communication connection(s) 126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 112 may include input device(s) 124 such as keyboard, mouse, pen, voice input device, touch input device, infrared cameras, video input devices, and/or any other input device. Output device(s) 122 such as one or more displays, speakers, printers, and/or any other output device may also be included in device 112. Input device(s) 124 and output device(s) 122 may be connected to device 112 via a wired connection, wireless connection, or any combination thereof. In one embodiment, an input device or an output device from another computing device may be used as input device(s) 124 or output device(s) 122 for computing device 112.

Components of computing device 112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 112 may be interconnected by a network. For example, memory 118 may be comprised of multiple physical memory units located in different physical locations interconnected by a network.

Those skilled in the art will realize that storage devices utilized to store computer readable instructions may be distributed across a network. For example, a computing device 130 accessible via network 128 may store computer readable instructions to implement one or more embodiments provided herein. Computing device 112 may access computing device 130 and download a part or all of the computer readable instructions for execution. Alternatively, computing device 112 may download pieces of the computer readable instructions, as needed, or some instructions may be executed at computing device 112 and some at computing device 130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of associating names with physical locations using a device comprising a processor and having access to a location database, the method comprising:
   executing on the processor instructions configured to:
      upon receiving from the user a name of a physical location, store in the location database the physical location, the name, and a privacy designation selected from a set of privacy designations comprising a public designation and a private designation;

designate, among at least two names of a physical location, at least one authoritative name of the physical location; and upon detecting a current physical location of the user:
select from the location database at least one name of the current physical location having one of:
a public designation, and
a private designation that permits access by the user; and
present to the user the at least one name of the current physical location selected from the location database, presenting with emphasis the authoritative names of the physical location.

2. The method of claim 1:
the device having access to an authoritative location name source, and
the location database configured to identify a name derived from the authoritative location name source as an authoritative name of a physical location.

3. The method of claim 1, the location database configured to associate with respective locations an area designation representing an area associated with the name.

4. The method of claim 3, storing the physical location in the location database comprising:
receiving from the user an area designation of the name, and
storing the area designation with the physical location in the location database.

5. The method of claim 3:
the physical location database configured to associate with an area designation at least one user who is permitted to name the area designation; and
storing the physical location in the location database comprising:
identifying the user;
querying whether the user is permitted to name the area; and
upon verifying that the user is permitted to name the area, storing the name of the physical location in the location database.

6. The method of claim 1, detecting the current physical location of the user comprising:
detecting an approximate current physical location of the user;
presenting the approximate current physical location to the user; and
upon receiving from the user a selection of a more accurate current physical location, selecting the more accurate current physical location as the current physical location.

7. The method of claim 1:
the device comprising a geolocation component configured to detect a current physical location of the user, and
detecting the current physical location of the user comprising: receiving the current physical location of the user from the geolocation component.

8. The method of claim 1, presenting to the user at least one name of the current physical location comprising:
calculating a distance of a physical location having a name to the current physical location of the user, and
presenting to the user the at least one name of the physical location sorted according to the distances of the physical locations of the names to the physical location of the user.

9. The method of claim 1, comprising: upon receiving from the user a name query:
querying the location database for physical locations matching the name query, and
upon finding at least one physical location matching the name query, presenting the names of the at least one physical location to the user.

10. The method of claim 9:
the name query comprising a name type filter selected from a set of name type filters comprising:
an all names filter having no restrictions on the names of the physical location,
an author identifier filter restricting the names of the physical location to names having an author identifier of at least one specified author; and
selecting names of a physical location from the location database comprising:
restricting the names of the physical location selected from the location database to names matching the name type filter.

11. The method of claim 10:
the location database configured to designate, among at least one name of a physical location, at least zero authoritative names of the physical location; and
the set of name type filters comprising an authoritative name filter restricting presented names of the physical location to authoritative names of the physical location.

12. The method of claim 10:
the location database comprising at least one author group comprising at least one author, and
the set of name type filters comprising an author group filter restricting presented names of the physical location to names having an author identifier of an author within at least one specified author group.

13. The method of claim 10:
the location database configured to associate with a name of a physical location at least one event; and
the set of name type filters comprising an event filter restricting presented names of the physical location to names associated with at least one specified event.

14. The method of claim 10:
the location database configured to associate with a name of a physical location a valid duration; and
the set of name type filters comprising a time filter restricting presented names of the physical location to names having a valid duration comprising a specified time.

15. The method of claim 9, comprising:
upon failing to find at least one physical location matching the name query:
query the user whether to name the current physical location of the user as the name query, and
upon receiving from the user a confirmation, storing the name and the current physical location of the user in the location database.

16. The method of claim 1:
the location database configured to associate with a name of a physical location at least one user who is permitted to view the name; and
selecting respective names of a physical location from the location database comprising:
querying whether the user is permitted to view the name; and
upon verifying that the user is permitted to view the name, selecting the name of the physical location from the location database.

17. A nonvolatile computer-readable storage medium comprising instructions that, when executed on a processor of a device having access to a location database configured to designate, among at least one name of a physical location, at least zero authoritative names of the physical location, and to associate with respective physical locations an area designation representing an area associated with the name, associate names with physical locations by:
- upon receiving from the user for a name of a physical location, an area designation of an area of the physical location, and a privacy designation selected from a set of privacy designations comprising a public designation and a private designation, storing in the location database the physical location by:
  - querying whether the user is permitted to name the area, and
  - upon verifying that the user is permitted to name the area, storing the physical location, the area designation, the name, the privacy designation, and an author identifier identifying the user in the location database;
- detecting a current physical location of the user by:
  - detecting an approximate current physical location of the user;
  - presenting the approximate current physical location to the user; and
  - upon receiving from the user a selection of a more accurate current physical location, selecting the more accurate current physical location as the current physical location;
- upon detecting the current physical location of the user:
  - selecting from the location database at least one name of the current physical location having one of:
    - a public designation, and
    - a private designation and an author identifier identifying the user; and
  - presenting to the user the at least one name of the current physical location by:
    - calculating a distance of a physical location having a name to the current physical location of the user,
    - presenting to the user the at least one name of the physical location selected from the location database, the names sorted according to the distances of the physical locations of the names to the current physical location, and
    - emphasizing the names designated as authoritative names of the physical location; and
- upon receiving from the user a name query:
  - querying the location database for physical locations matching the name query;
  - upon finding at least one physical location matching the name query, presenting the names of the physical locations to the user; and
  - upon failing to find at least one physical location matching the name query:
    - query the user whether to name the physical location of the user as the name query, and
    - upon receiving from the user a confirmation, storing the name and the physical location of the user in the location database.

18. A method of associating names with physical locations using a device comprising a processor and having access to a location database, the method comprising:
executing on the processor instructions configured to:
- associate with respective physical locations in the location database at least one user who is permitted to name the physical location;
- upon receiving from a user a name of a physical location:
  - query whether the user is permitted to name the area; and
  - upon verifying that the user is permitted to name the area, store in the location database the physical location, the name, and a privacy designation selected from a set of privacy designations comprising a public designation and a private designation; and
- upon detecting a current physical location of the user:
  - select from the location database at least one name of the current physical location having one of:
    - a public designation, and
    - a private designation that permits access by the user; and
  - present to the user the at least one name of the current physical location selected from the location database.

19. The method of claim 18, the instructions configured to, upon receiving from the user a name query:
- query the location database for physical locations matching the name query, and
- upon finding at least one physical location matching the name query, present the names of the at least one physical location to the user.

20. The method of claim 18:
the name query comprising a name type filter selected from a set of name type filters comprising:
- an all names filter having no restrictions on the names of the physical location,
- an author identifier filter restricting the names of the physical location to names having an author identifier of at least one specified author; and
selecting names of a physical location from the location database comprising:
restricting the names of the physical location selected from the location database to names matching the name type filter.

* * * * *